US011023790B2

(12) United States Patent
Natori

(10) Patent No.: US 11,023,790 B2
(45) Date of Patent: Jun. 1, 2021

(54) SYSTEM, METHOD FOR CONTROLLING THE SAME, AND METHOD FOR CONTROLLING SERVER

(71) Applicant: CANON KABUSHIKI KAISHA, Tokyo (JP)

(72) Inventor: Hideo Natori, Hino (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/674,501

(22) Filed: Nov. 5, 2019

(65) Prior Publication Data
US 2020/0151526 A1 May 14, 2020

(30) Foreign Application Priority Data
Nov. 9, 2018 (JP) .............................. JP2018-211662

(51) Int. Cl.
G06K 15/02 (2006.01)
H04N 1/00 (2006.01)
G06F 3/12 (2006.01)

(52) U.S. Cl.
CPC ....... *G06K 15/1814* (2013.01); *G06F 3/1204* (2013.01); *G06F 3/1205* (2013.01); *G06F 3/1263* (2013.01); *G06F 3/1293* (2013.01); *G06K 15/1809* (2013.01); *H04N 1/00403* (2013.01)

(58) Field of Classification Search
None
See application file for complete search history.

(56) References Cited

U.S. PATENT DOCUMENTS

| | | | |
|---|---|---|---|
| 2008/0152188 A1* | 6/2008 | Yokokura | H04N 1/00408 382/100 |
| 2011/0054908 A1* | 3/2011 | Matsuda | G10L 15/26 704/275 |
| 2013/0003106 A1* | 1/2013 | Nishida | G06K 15/4095 358/1.14 |
| 2016/0260432 A1* | 9/2016 | Buser | B29C 64/393 |
| 2018/0288248 A1* | 10/2018 | Shen | G10L 15/30 |
| 2019/0068809 A1* | 2/2019 | Shiga | H04N 1/00962 |
| 2019/0156825 A1* | 5/2019 | Shiga | G10L 15/22 |
| 2019/0384546 A1* | 12/2019 | Tomioka | G06F 3/167 |
| 2019/0387111 A1* | 12/2019 | Kobayashi | H04N 1/00923 |
| 2020/0028979 A1* | 1/2020 | Yamaguchi | G06F 3/1256 |

FOREIGN PATENT DOCUMENTS

JP  2015-100020 A  5/2015

* cited by examiner

*Primary Examiner* — Miya J Williams
(74) *Attorney, Agent, or Firm* — Canon U.S.A., Inc., IP Division

(57) ABSTRACT

A system includes a server and a printing apparatus. The server manages a first printing content and a second printing content as a predetermined printing target. When an instruction user issues a speech instruction for printing the predetermined printing target to an audio control device as an n-th speech print instruction, the server selects the first printing content associated with the predetermined printing target.

16 Claims, 14 Drawing Sheets

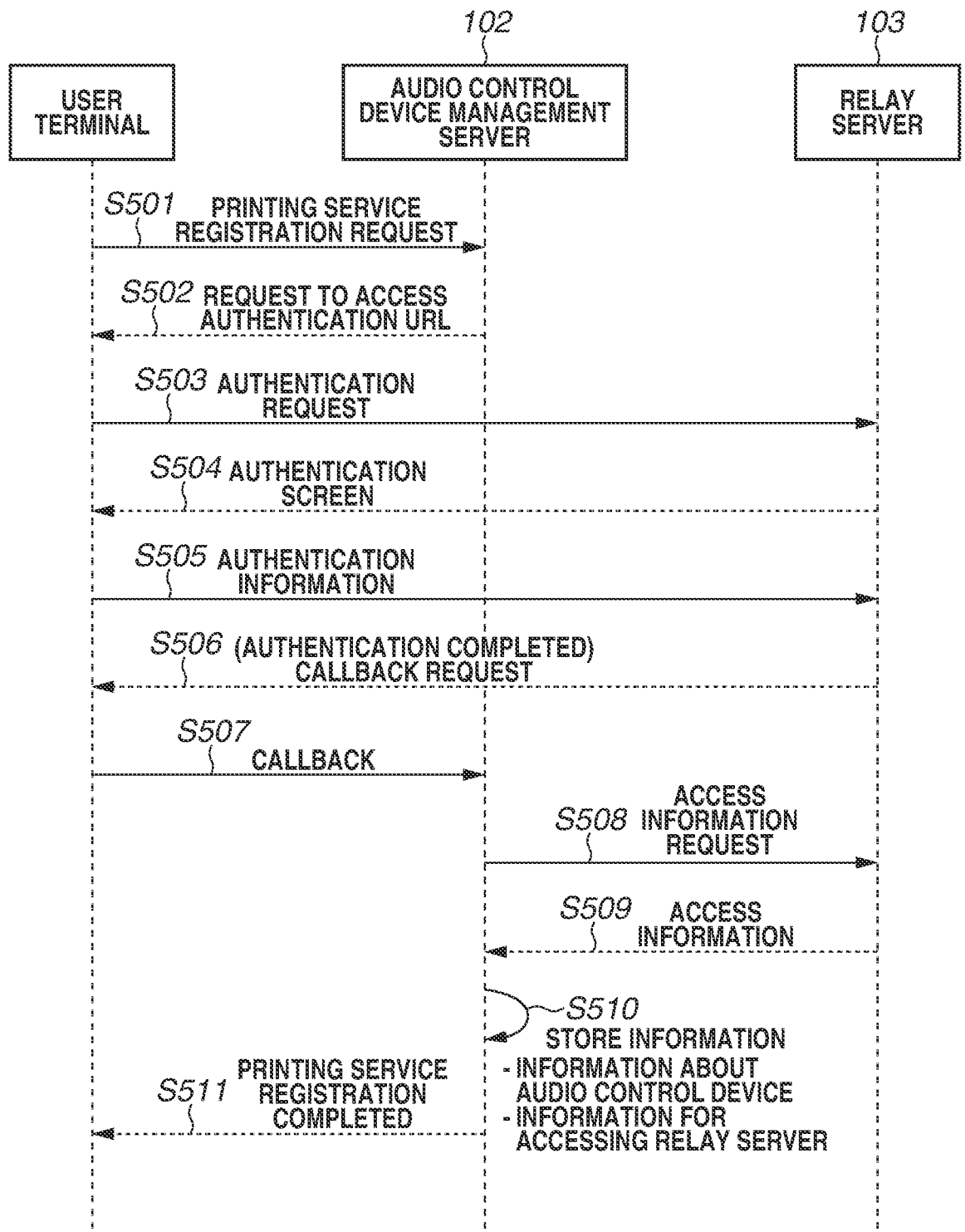

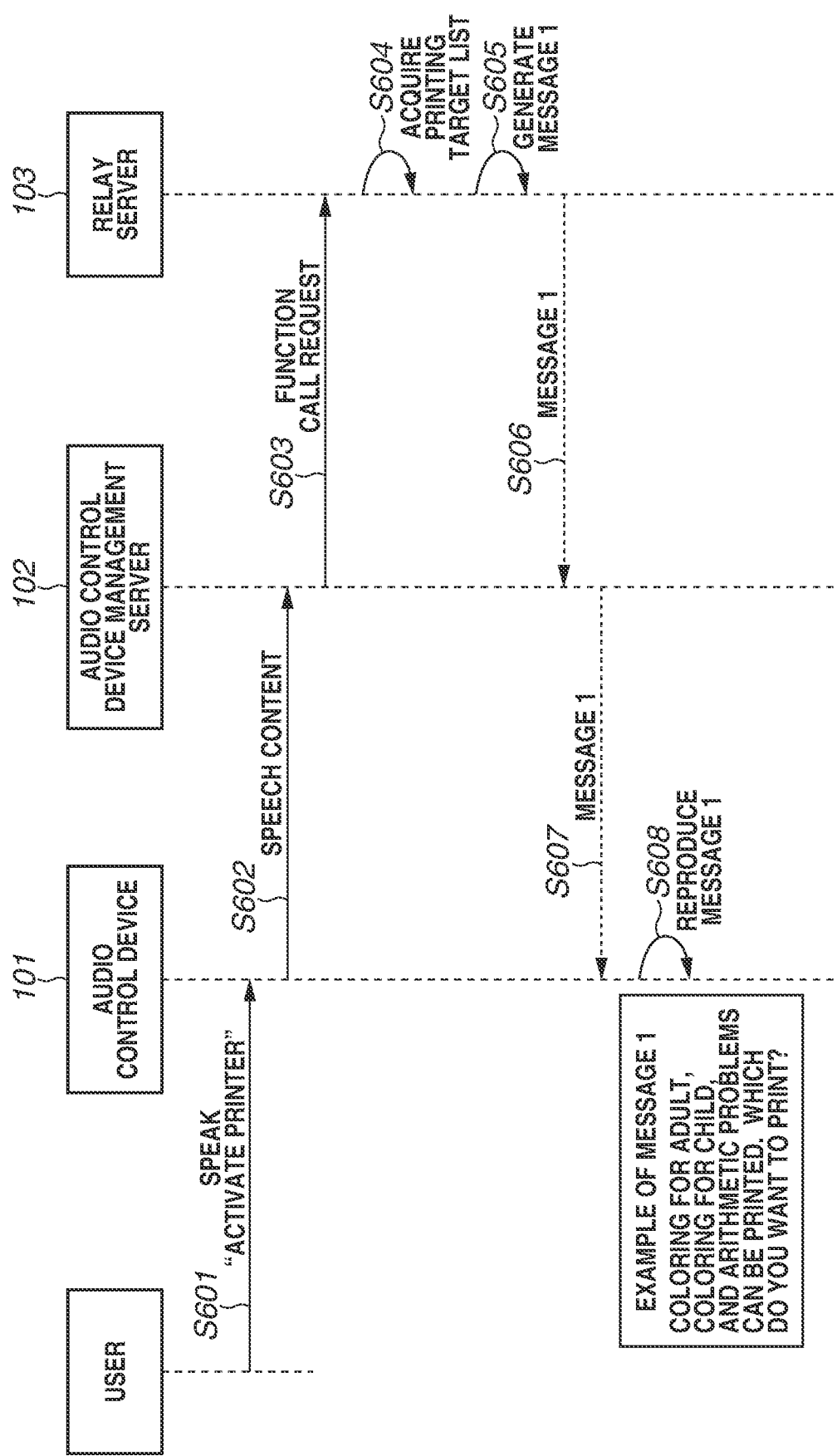

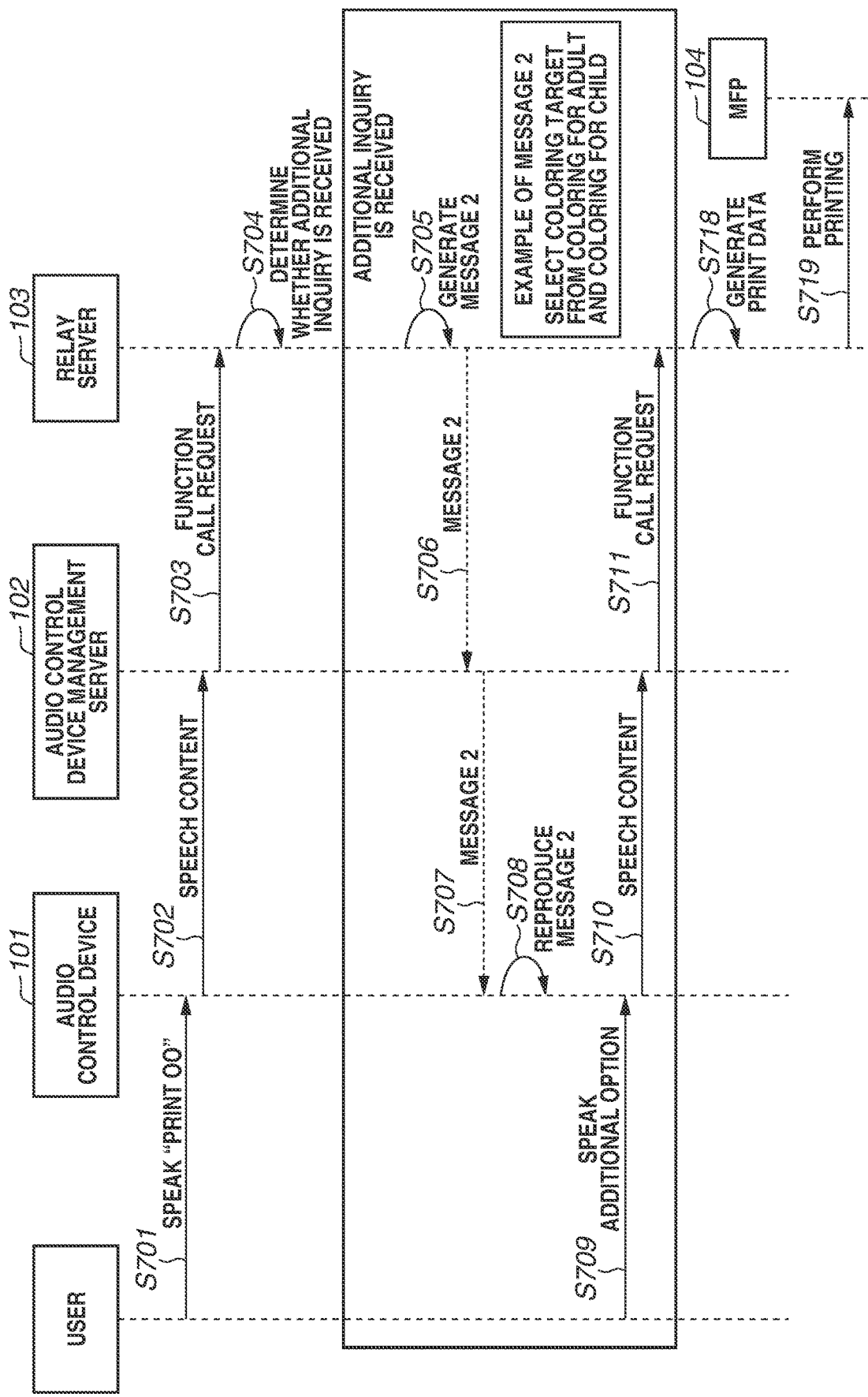

FIG.8

| PRINTING TARGET | PRINTING CONTENT | CONTENT NUMBER | NEXT CONTENT NUMBER |
|---|---|---|---|
| COLORING FOR ADULT | COLORING FOR ADULT (PRIMARY) 1 | 1 | 2 |
| | COLORING FOR ADULT (PRIMARY) 2 | 2 | 3 |
| | COLORING FOR ADULT (PRIMARY) 3 | 3 | 4 |
| | COLORING FOR ADULT (MEDIUM) 1 | 4 | 5 |
| | COLORING FOR ADULT (MEDIUM) 2 | 5 | 6 |
| | COLORING FOR ADULT (ADVANCED) | 6 | 1 |
| COLORING FOR CHILD | FOR CHILD 1 | 1 | 2 |
| | FOR CHILD 2 | 2 | 3 |
| | FOR CHILD 3 | 3 | 4 |
| | FOR CHILD 4 | 4 | 1 |
| ARITHMETIC PROBLEMS | ARITHMETIC PROBLEMS (PRIMARY) 1 | 1 | 2 |
| | ARITHMETIC PROBLEMS (PRIMARY) 2 | 2 | 3 |
| | ARITHMETIC PROBLEMS (MEDIUM) 1 | 3 | 4 |
| | ARITHMETIC PROBLEMS (MEDIUM) 2 | 4 | 5 |
| | ARITHMETIC PROBLEMS (ADVANCED) | 5 | 1 |

FIG.9

| SPEAKER 901 | PRINTING TARGET 902 | LAST PRINT SETTINGS 903 | LAST CONTENT NUMBER 904 |
|---|---|---|---|
| U11 | COLORING FOR ADULT | PAPER SIZE: LETTER, NUMBER OF COPIES: 1 | 1 |
| U11 | COLORING FOR CHILD | PAPER SIZE: LETTER, NUMBER OF COPIES: 2 | 2 |
| U21 | COLORING FOR ADULT | PAPER SIZE: A4, NUMBER OF COPIES: 3 | 4 |
| U22 | COLORING FOR CHILD | PAPER SIZE: A4, NUMBER OF COPIES: 1 | 3 |
| U22 | ARITHMETIC PROBLEMS | PAPER SIZE: A4, NUMBER OF COPIES: 1 | 2 |
| U2 | ARITHMETIC PROBLEMS | PAPER SIZE: A4, NUMBER OF COPIES: 1 | 1 |
| U4 | COLORING FOR ADULT | PAPER SIZE: LETTER, NUMBER OF COPIES: 6 | 5 |

FIG.11

| SUBSTITUTE SPEAKER *1101* | SPECIFIC WORD *1102* | CONSIGNMENT SPEAKER *1103* | CONSIGNMENT PRINTING TARGET *1104* |
|---|---|---|---|
| U21 | SON | U22 | COLORING FOR CHILD |
| | | | ARITHMETIC PROBLEMS |

FIG.12

| PRINTING TARGET | PRINTING CONTENT | CONTENT NUMBER | NEXT CONTENT NUMBER |
|---|---|---|---|
| COLORING FOR ADULT | COLORING FOR ADULT (PRIMARY) 1 | 1 | 2 |
| | COLORING FOR ADULT (PRIMARY) 2 | 2 | 3 |
| | COLORING FOR ADULT (PRIMARY) 3 | 3 | 7 |
| | COLORING FOR ADULT (MEDIUM) 1 | 7 | 8 |
| | COLORING FOR ADULT (MEDIUM) 2 | 8 | 9 |
| | COLORING FOR ADULT (ADVANCED) | 9 | 1 |
| COLORING FOR CHILD | FOR CHILD 1 | 1 | 2 |
| | FOR CHILD 2 | 2 | 3 |
| | FOR CHILD 3 | 3 | 4 |
| | FOR CHILD 4 | 4 | 1 |
| ARITHMETIC PROBLEMS | ARITHMETIC PROBLEMS (PRIMARY) 1 | 1 | 2 |
| | ARITHMETIC PROBLEMS (PRIMARY) 2 | 2 | 3 |
| | ARITHMETIC PROBLEMS (MEDIUM) 1 | 3 | 4 |
| | ARITHMETIC PROBLEMS (MEDIUM) 2 | 4 | 5 |
| | ARITHMETIC PROBLEMS (ADVANCED) | 5 | 1 |

1201 1202 1203 1205

SYSTEM, METHOD FOR CONTROLLING THE SAME, AND METHOD FOR CONTROLLING SERVER

BACKGROUND

Field

The present disclosure relates to a system, a method for controlling the system, and a method for controlling a server.

Description of the Related Art

Japanese Patent Application Laid-Open No. 2015-100020 discusses a technique for issuing a print instruction by depressing a print button displayed on a portable terminal. In the technique discussed in Japanese Patent Application Laid-Open No. 2015-100020, a user needs to press the print button to issue a print instruction. In recent years, with the use of printing apparatuses in various scenes, there has been a demand for a technique for improving printing-related operability.

SUMMARY

According to the present disclosure, a system includes a server and a printing apparatus. The server includes a first management unit configured to manage a first printing content and a second printing content as a predetermined printing target, a selection unit configured to select the first printing content associated with the predetermined printing target, when an instruction user issues a speech instruction for printing the predetermined printing target to an audio control device as an n-th speech print instruction, and a second management unit configured to manage printing history information for the instruction user. When the instruction user issues a speech instruction for printing the predetermined printing target to the audio control device as an (n+1)-th speech print instruction following the n-th speech print instruction, the selection unit selects the second content based on the printing history information for the instruction user. The printing apparatus includes a printing unit configured to print the print data based on the first printing content and the print data based on the second printing content.

Further features of the present disclosure will become apparent from the following description of exemplary embodiments with reference to the attached drawings.

BRIEF DESCRIPTION OF THE DRAWINGS

FIG. 5 is a sequence diagram illustrating processing for associating the audio control device with the MFP.

FIG. 6 is a sequence diagram illustrating processing for activating the printing system.

FIG. 7 is a sequence diagram illustrating print processing.

FIG. 8 illustrates a table for associating a printing target, a printing content, and a printing order with each other.

FIG. 9 illustrates a table for managing a printing history of a speaker.

FIG. 11 illustrates a table for associating a substitute speaker, a consignment speaker, and a consignment printing target with each other.

FIG. 12 illustrates another table for associating a printing target, a printing content, and a printing order with each other.

DESCRIPTION OF THE EMBODIMENTS

Figure 1:
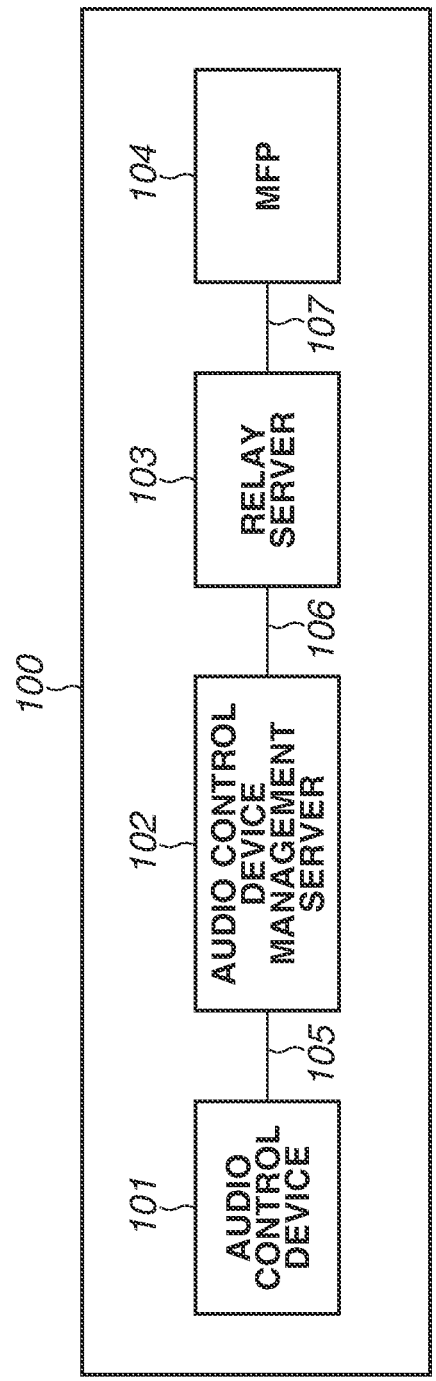
FIG. 1 illustrates a configuration of a printing system.

Exemplary embodiments of the present disclosure will be described in detail below with reference to the accompanying drawings. The following exemplary embodiments do not limit the present disclosure within the ambit of the appended claims. Not all of the combinations of the features described in the present exemplary embodiment are indispensable to the solutions for the present disclosure. Identical components are assigned identical reference numerals, and redundant descriptions thereof will be omitted.

FIG. 1 illustrates an example of a configuration of a printing system 100 according to a first exemplary embodiment. The printing system 100 illustrated in FIG. 1 includes an audio control device 101, an audio control device management server 102, a relay server 103, and a multifunction peripheral (MFP) 104. The MFP 104 is an example of a printing apparatus having a print function. According to the present exemplary embodiment, the MFP 104 is a multifunction peripheral. In the printing system 100, the user can issue a speech print instruction. The audio control device 101 is configured to perform speech recognition on user's voice input to a microphone, transmit audio data via a network 105, and output the audio data received via the network 105 from a speaker 201. The audio control device management server 102 manages the audio control device 101, for example, associates the audio control device 101 with the MFP 104. The audio control device management server 102 performs predetermined processing (described below), for example, according to the content of audio data received from the audio control device 101. The network 105 can be, for example, the Internet.

Figure 2:
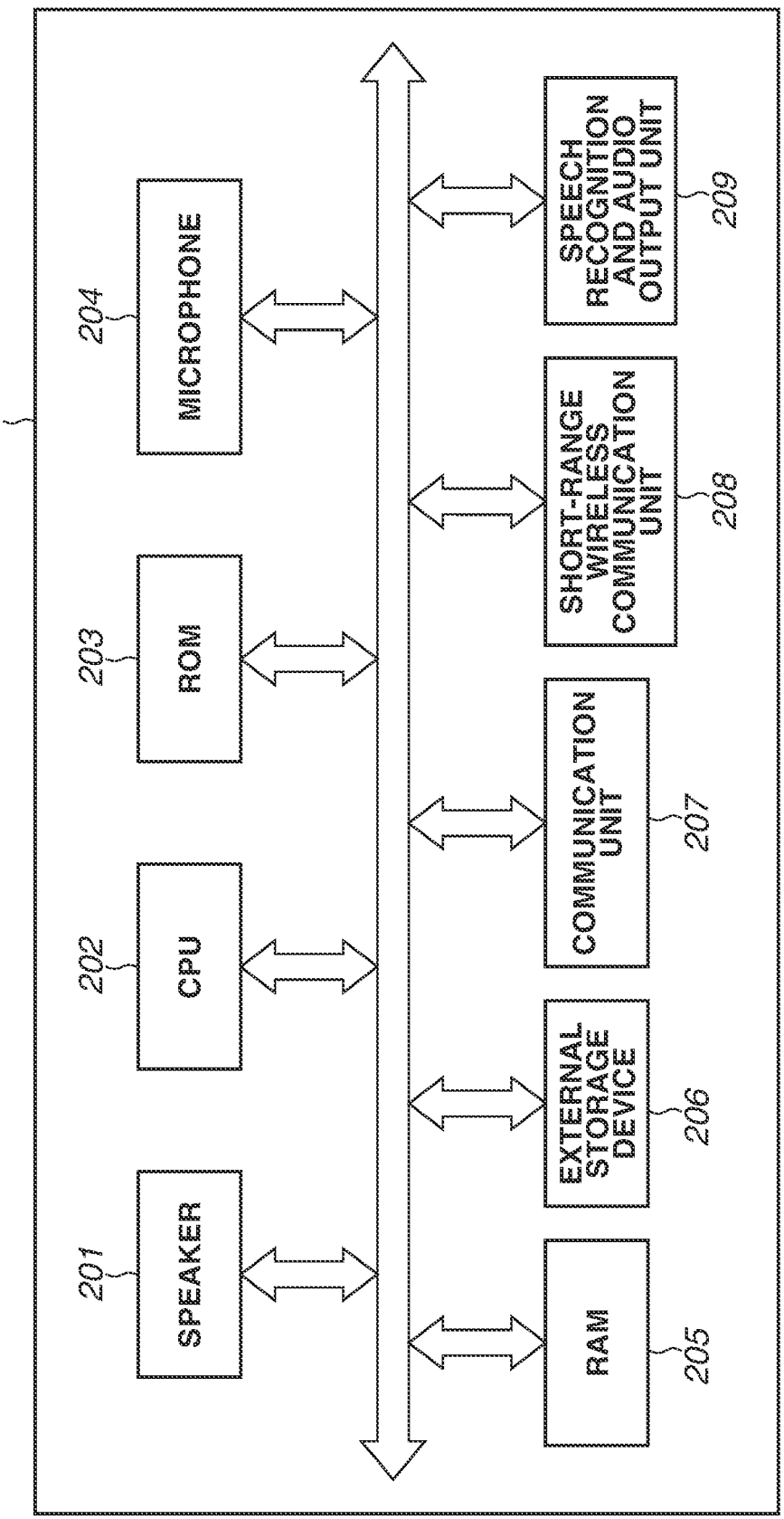
FIG. 2 is a block diagram illustrating a configuration of an audio control device.

The audio control device management server 102 and the relay server 103 are connected with each other via a network 106 such as the Internet. The audio control device management server 102 transmits a function call request (described below) to the relay server 103. The relay server 103 controls the MFP 104, for example, to generate print data according to a request from the audio control device management server 102 and transmit the print data to the MFP 104. The relay server 103 and the MFP 104 are connected with each other via a network 107, such as the Internet. The relay server 103 issues a print instruction to the MFP 104 via the network 107. The MFP 104 is an image forming apparatus for forming an image on a recording medium based on a certain recording method, such as an ink-jet recording method and an electrophotographic method. The audio control device management server 102 and the relay server 103 may be configured as a single apparatus or a plurality of apparatuses. FIG. 2 is a block diagram illustrating a hardware configuration of the audio control device 101. The audio control device 101 includes the speaker 201, a central processing unit (CPU) 202, a read only memory (ROM) 203, a microphone 204, a random access memory (RAM) 205, an external storage device 206, a communication unit 207, a short-range wireless communication unit 208, and a speech recognition and audio output unit 209. The blocks illustrated in FIG. 2 are connected with each other, for example, via an internal bus. CPU represents a central processing unit, ROM represents a read only memory, and RAM represents a random access memory. Operations of the audio control device 101 according to the present exemplary embodiment are implemented when the CPU 202 loads a program stored in the ROM 203 into the RAM 205 and then executes the program.

The speaker 201 outputs sound based on audio data. The CPU 202 is formed, for example, on a system control substrate, and comprehensively controls the audio control device 101. The ROM 203 stores control programs to be executed by the CPU 202, data tables, and fixed data including programs of an embedded operating system (OS). According to the present exemplary embodiment, each control program stored in the ROM 203 is subjected to software execution control by the embedded OS stored in the ROM 203. Examples of software execution control processing include scheduling, task switching, and interrupt processing. The microphone 204 receives sound around the audio control device 101, such as voice uttered by the user.

The RAM 205 is composed of, for example, a static random access memory (SRAM) which uses a backup power source. Since data in the RAM 205 is retained by a primary battery for data backup (not illustrated), the RAM 205 can retain program control variables and other data in a nonvolatile way. The RAM 205 includes a memory area for storing setting information and management data for the audio control device 101. The RAM 205 is also used as the main memory of the CPU 202 and as a work memory. The external storage device 206 stores application software.

The communication unit 207 includes a circuit and an antenna for performing communication according to a predetermined wireless communication method. For example, the communication unit 207 can be wirelessly connected with an access point. The communication unit 207 can also temporarily operate as an access point. A temporary access point is used to connect with a portable terminal (not illustrated). The portable terminal transmits a Service Set Identifier (SSID) of an external access point with which the audio control device 101 is to be connected. Wireless communication according to the present exemplary embodiment may be configured to operate according to a wireless local area network (LAN) communication method conforming to the IEEE802.11 standard series or configured to operate according to other wireless communication methods. The short-range wireless communication unit 208 carries out short-range wireless communication with other apparatuses existing within a range of a fixed short distance from the audio control device 101. The short-range wireless communication unit 208 carries out communication based on a wireless communication method different from the method for the communication unit 207. According to the present exemplary embodiment, the short-range wireless communication unit 208 operates according to the Bluetooth (registered trademark) standard.

The speech recognition and audio output unit 209 performs the speech recognition on a sound input through the microphone 204 to generate audio data, converts audio data received from the outside or prestored message data into an audio signal, and outputs the audio signal as a sound from the speaker 201.

Figure 3:
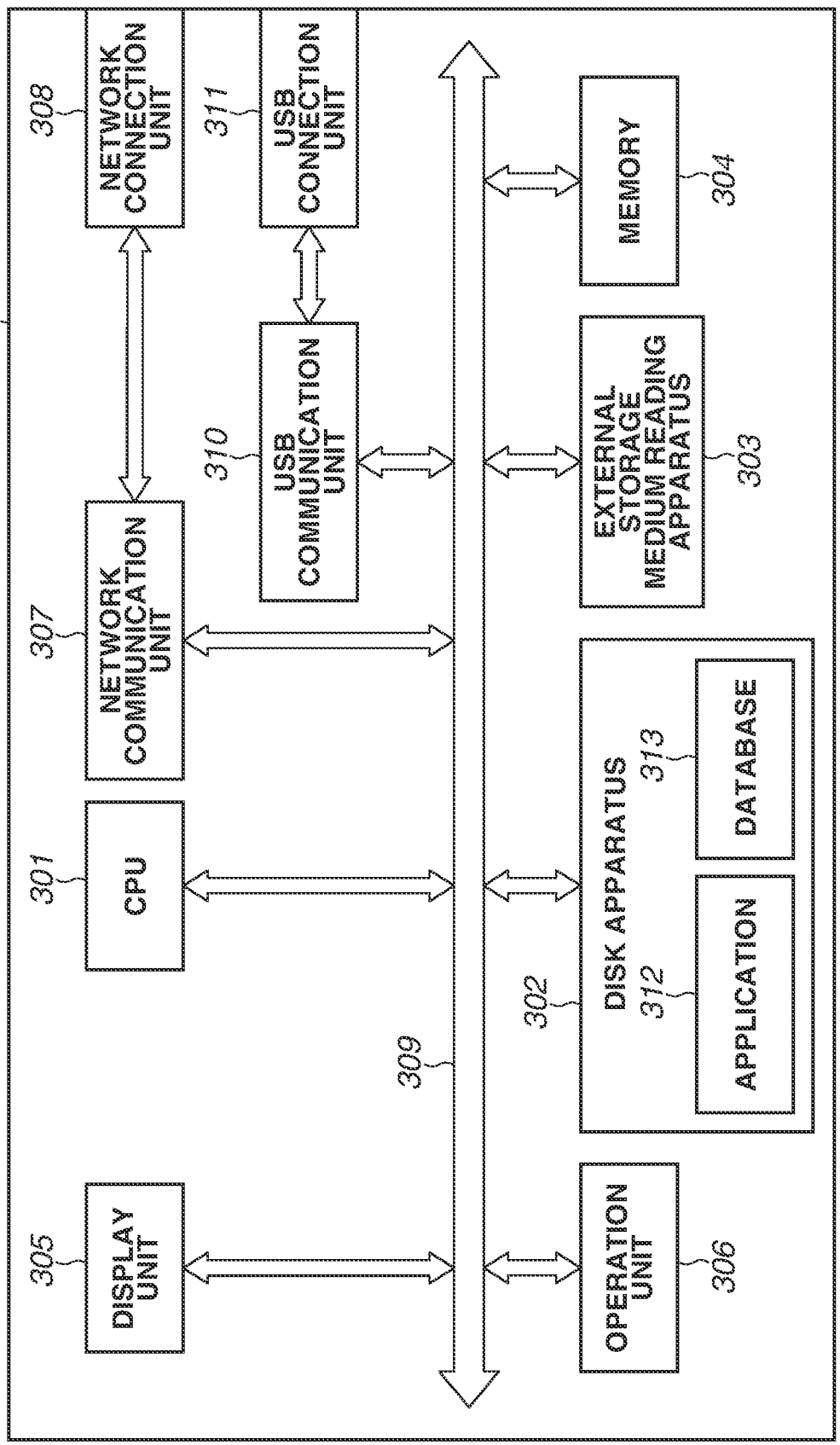
FIG. 3 is a block diagram illustrating a configuration of an audio control device management server and a relay server.

FIG. 3 is a block diagram illustrating a configuration of the audio control device management server 102 and the relay server 103. Since FIG. 3 illustrates a configuration common to the two apparatuses, the following descriptions will be made with respect to the configuration of the audio control device management server 102.

A CPU 301 is a central processing unit for comprehensively controlling the audio control device management server 102. A disk apparatus 302 is a secondary storage device for storing an application program 312, a database 313, an OS, and other various types of files and data. An external storage medium reading apparatus 303 is an apparatus for reading information of files stored in an external storage medium, such as a secure digital (SD) card. A memory 304, a temporary storage device composed of a RAM, is used to temporarily store and buffer the data.

A display unit 305 including, for example, a liquid crystal display (LCD) displays various types of information. An operation unit 306 including a keyboard and a mouse is used by the user to perform various input operations, and can receive instructions and operations from the user. A network communication unit 307 is connected with a network such as the Internet via a network connection unit 308 to perform various types of communications. The network connection unit 308 supports such network media as a wired LAN and a wireless LAN. When supporting a wired LAN, the network connection unit 308 is a connector for connecting a wired LAN cable. When supporting a wireless LAN, the network connection unit 308 is an antenna. The network connection unit 308 may support both a wired LAN and a wireless LAN. A Universal Serial Bus (USB) communication unit 310 is connected with various peripheral apparatuses via a USB connection unit 311 to perform various types of communications.

The blocks illustrated in FIG. 3 are connected with each other via a bus 309. Operations of the audio control device management server 102 (or the relay server 103) according to the present exemplary embodiment are implemented when the CPU 301 loads a program used for the processing into the memory 304 from the disk apparatus 302 and then executes the program. A speech recognition function of the speech recognition and audio output unit 209 illustrated in FIG. 2 may be included in the configuration illustrated in FIG. 3. In that case, for example, an apparatus including the configuration illustrated in FIG. 3 can perform the speech recognition on the audio signal transmitted from the audio control device 101, and recognize and extract a predetermined word. For example, the apparatus can perform the speech recognition on the audio signal transmitted from the audio control device 101, and identify the speaker of the audio. Although, in the present exemplary embodiment, the audio control device management server 102 and the relay server 103 are described as separate apparatuses, the two apparatuses may be configured to constitute a printing control apparatus integrating their server functions.

Figure 4:
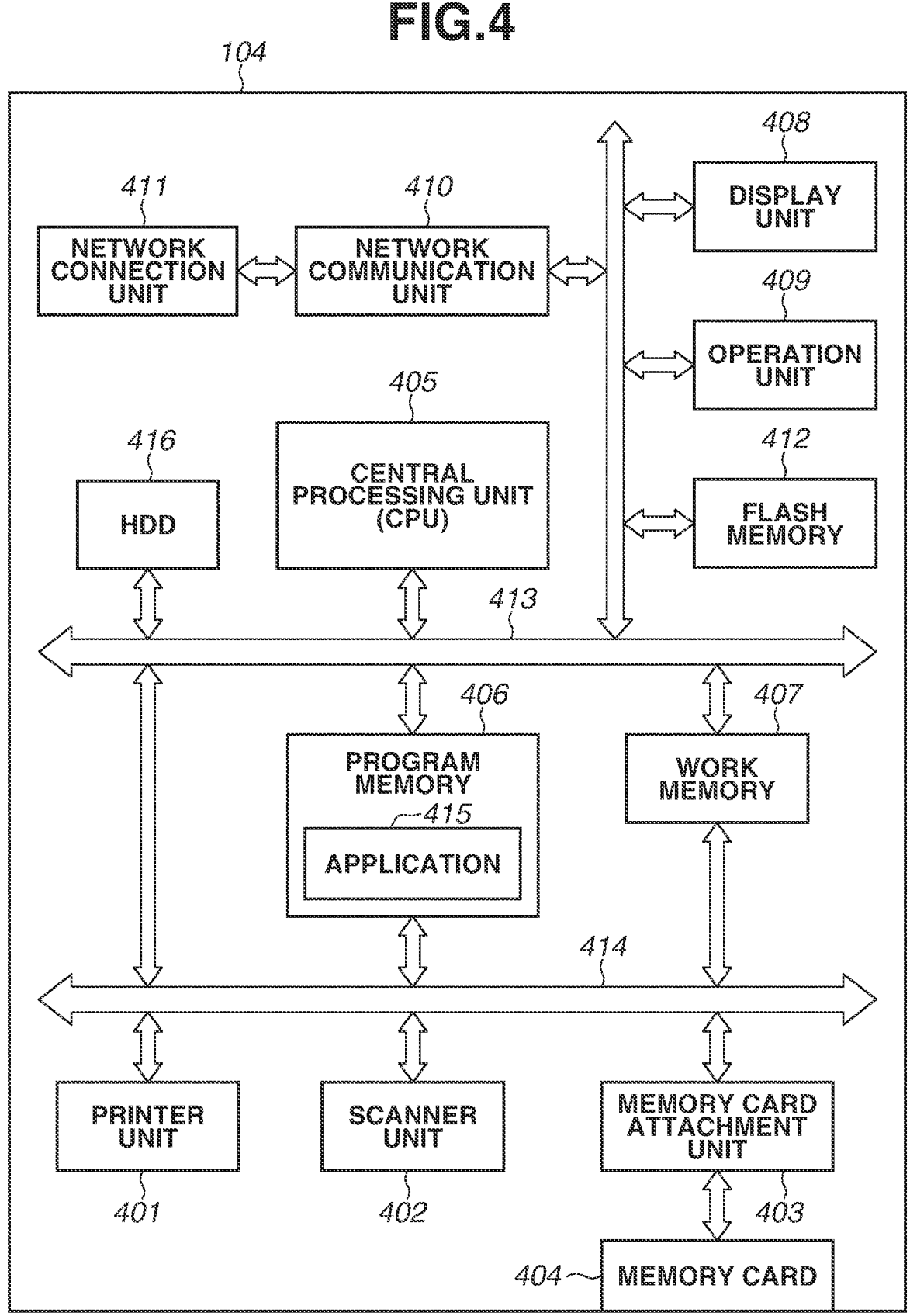
FIG. 4 is a block diagram illustrating a configuration of a multifunction peripheral (MFP).

FIG. 4 is a block diagram illustrating a configuration of the MFP 104. While, in the present exemplary embodiment, a multifunction peripheral is described as an example of the MFP 104, an apparatus having a form other than a multifunction peripheral is also applicable to the exemplary embodiment as long as the apparatus has a printing function. For example, an image processing apparatus, a copying machine, a facsimile, and a single-function printing apparatus are also applicable to the exemplary embodiment. In the MFP 104, a print function is implemented by a print unit 401, a scanner function is implemented by a scanner unit 402, and a storage function is implemented by a memory card attachment unit 403 and a memory card 404. The above-described units are connected with each other via a bus 414.

The print unit 401 records image data received from the outside and image data stored in the memory card 404 on a recording medium, such as a print sheet, based on an ink-jet recording method or an electrophotographic method. The print unit 401 manages information about consumable materials including ink information, such as the remaining ink amount, and paper information, such as the number of stacked sheets.

The scanner unit 402 optically reads a document set on a document plate (not illustrated), converts read data into electronic data, and further converts the electronic data into image data in a specified file format. The converted image data is transmitted to an external apparatus via a network or stored in a storage area such as a hard disk drive (HDD) 416. In copy service, the scanner unit 402 reads a document placed on the document plate to generate image data and transmits the generated image data to the printer unit 401. Then, based on the image data, the printer unit 401 prints the image on a recording medium such as a print sheet.

The memory card 404 attached to the memory card attachment unit 403 records various types of file data. The file data may also be read from an external apparatus via a network and edited. The file data can also be received from an external apparatus and stored in the memory card 404.

The MFP 104 further includes a CPU 405, a program memory 406, a work memory 407, a display unit 408, an operation unit 409, a network communication unit 410, a network connection unit 411, and a flash memory 412. The CPU 405 is a central processing unit for comprehensively controlling each unit in the MFP 104. The program memory 406 including a ROM stores various types of program codes and an application 415 for communicating with an external server. The application 415 accesses the printer unit 401 to acquire information about consumable materials, such as the ink information and the paper information. The work memory 407 composed of a RAM is used to temporarily store and buffer image data when performing each service. The display unit 408, for example, composed of an LCD displays various types of information including user interface screens. The operation unit 409 including a keyboard, a mouse, and switches can receive instructions and operations from the user. The network communication unit 410 connects the MFP 104 to a network via the network connection unit 411 and performs various types of communications.

The network connection unit 411 supports such network media as a cable local area network (LAN) and a wireless LAN. When supporting a wired LAN, the network connection unit 308 is a connector for connecting a wired LAN cable. When supporting a wireless LAN, the network connection unit 308 is an antenna. The network connection unit 411 may support both a wired LAN and a wireless LAN. The flash memory 412 is a nonvolatile memory for storing image data received by the network communication unit 410. The above-described units are connected with each other via a bus 413. The MFP 104 may include a block for performing data conversion between the buses 414 and 413. Operations of the MFP 104 according to the present exemplary embodiment are implemented, for example, when the CPU 405 reads a program used for processing from the program memory 406 into the work memory 407 and then executes the program.

These configurations are to be considered as examples, and each apparatus may include hardware components in addition to the illustrated ones. In addition, a plurality of the blocks illustrated in FIGS. 2 to 4 may be integrated into one block, or any one block may be divided into two or more blocks. More specifically, each of the apparatuses illustrated in FIGS. 2, 3, and 4 may have other configurations as long as processing according to the present exemplary embodiment (described below) can be performed.

Processing for associating the audio control device 101 with the MFP 104 to enable the user to use services of the printing system 100 (operations according to the present exemplary embodiment) will be described below. FIG. 5 is a sequence diagram illustrating the processing for associating the audio control device 101 with the MFP 104. In step S501, the user transmits a printing service registration request to the audio control device management server 102 by using a user terminal such as a portable terminal and personal computer associated with the audio control device 101 in advance. This registration request may be issued, for example, on a local application installed in the user terminal or on a web page via a web browser.

Upon reception of the printing service registration request, in step S502, the audio control device management server 102 requests the user terminal to access a preregistered Uniform Resource Locator (URL) for the authentication by the relay server 103. Upon reception of the request, in step S503, the user terminal transmits an authentication request to the relay server 103 based on the URL for authentication. In step S504, the relay server 103 transmits authentication screen data to the user terminal. Upon acquisition of the authentication screen data, the user terminal displays an authentication screen based on the authentication screen data. Then, by using the displayed authentication screen, the user inputs authentication information to provide authentication for use of preregistered services of the relay server 103. The authentication information can be, for example, a user identifier (ID) and password registered for the user to log into the relay server 103.

When the user inputs the authentication information to use the services of the relay server 103 on the user terminal, then in step S505, the user terminal transmits the input authentication information to the relay server 103. The relay server 103 performs the authentication processing based on the authentication information transmitted from the user terminal. When this authentication processing is normally completed, in step S506, the relay server 103 transmits a callback request, together with an access information identifier, to the user terminal. In step S507, the user terminal transmits a callback to the audio control device management server 102.

Upon reception of the callback, in step S508, the audio control device management server 102 transmits an access information request, together with the access information identifier, to the relay server 103. In step S509, based on the access information identifier, the relay server 103 transmits access information to the audio control device management server 102. The audio control device management server 102 acquires an access token and refresh token for accessing the relay server 103 from the access information. By using the acquired access token, the audio control device management server 102 can access the relay server 103. The relay server 103 identifies a login user based on the access token, making it possible to identify the MFP 104 registered by the user.

In step S510, the audio control device management server 102 stores information including the access token and refresh token used to access the relay server 103, together with the information for the audio control device 101 associated with the user terminal. In step S511, the audio control device management server 102 transmits a screen indicating the completion of the printing service registration to the user terminal. According to the present exemplary embodiment, the term of validity of an access token and refresh token is infinity (or a limited period which can substantially be considered as infinity).

Although, in the above-described example, a user's authentication operation is used as a method for associating the audio control device 101 with the MFP 104, other methods are also applicable as long the audio control device 101 can be associated with the MFP 104.

A flow of processing since the user issues a speech instruction for printing a printing target to the audio control device 101 until the MFP 104 associated with the audio control device 101 performs printing will be described below. The printing target refers to a category of printing content, such as "Coloring for adult, coloring for child, and arithmetic problems" (described below).

First, in step S601, to call the function of performing printing by using the MFP 104, the user speaks "Activate the printer" to the microphone 204 of the audio control device 101. This speech content is preregistered on the audio control device management server 102 as a keyword (activation phrase) for calling the function of performing printing by using the MFP 104. The audio control device management server 102 also registers the relay server 103 as the request destination of this speech content.

In step S602, the audio control device 101 transmits the speech content received in step S601 to the management server 102. In this case, the audio control device 101 may transmit audio data corresponding to the received speech content as it is, or convert the audio data into text data and then transmit the text data as text information "Activate the printer". In step S603, the audio control device management server 102 issues a request calling the printing function to the relay server 103 as the request destination associated with the received keyword "Activate the printer". Upon reception of the request, in step S604, the relay server 103 acquires a list of printable printing targets. This list is stored as fixed values in the relay server 103 serving as the printing system.

Figure 10:
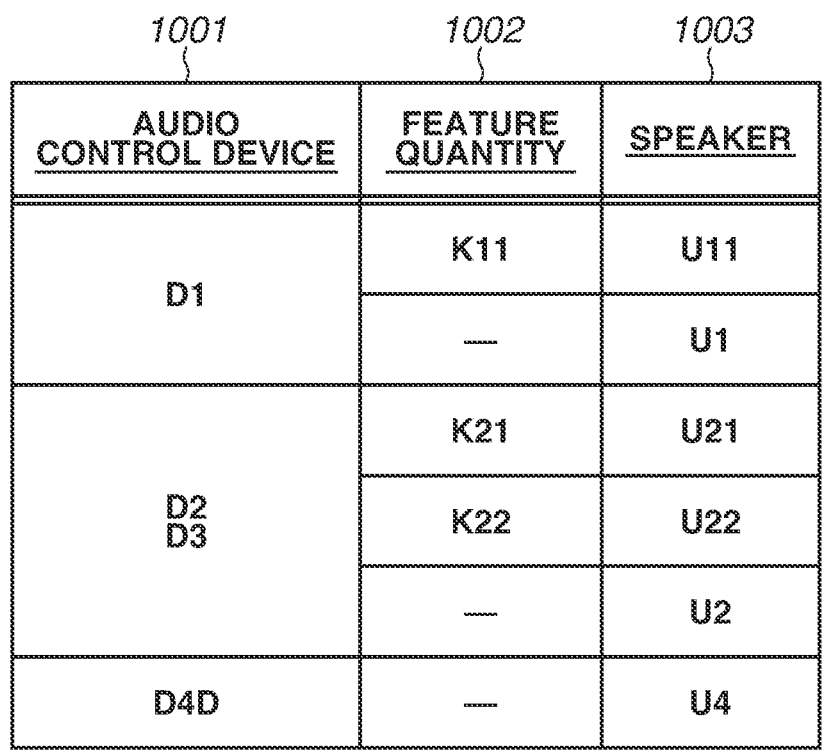
FIG. 10 illustrates a table for associating the speaker with a keyword characteristic.

The audio control device management server 102 can identify a speaker based on the audio data. FIG. 10 illustrates an example of a table kept in the audio control device management server 102 in the disk apparatus 302, for example. An item 1001 indicates the audio control device 101 connected to the audio control device management server 102. When the speaker has a plurality of the audio control devices 101, these devices are collectively represented as, for example, "D2" and "D3". An item 1002 indicates the feature quantity obtained based on the audio data. A mark "-" indicates that there is no feature quantity. An item 1003 indicates information for identifying a speaker. Referring to the table illustrated in FIG. 10, the audio control device management server 102 identifies a speaker having the same feature quantity as that obtained from the audio data for each audio control device. For example, when the user speaks a keyword to the audio control device "D1", if the feature quantity obtained from the audio data of the keyword is "K11", the audio control device management server 102 identifies the speaker as "U11". On the other hand, for example, when the user speaks a keyword to the audio control device 101 "D1", if the feature quantity obtained from the audio data of the keyword is not "K11", the audio control device management server 102 identifies the speaker as "U1" who has the unregistered feature quantity. For example, when the user speaks a keyword to the audio control device "D4", all users are identified as "U4" as a speaker who has the unregistered feature quantity since the feature of the keyword is not recorded in the table. The identified speaker information is supplied to the relay server 103, in the function call request in step S603.

FIG. 8 illustrates an example of a table kept in the relay server 103. The table illustrated in FIG. 8 is kept, for example, in the disk apparatus 302. An item 801 in the table indicates the printing content category managed as the printing target. Referring to the table illustrated in FIG. 8, "Coloring for adult, coloring for child, and arithmetic problems" are managed as a list of printing targets. An item 802 indicates a plurality of printing contents associated with each printing target. For example, referring to FIG. 8, six printing contents are associated with "Coloring for adult", four printing contents are associated with "Coloring for child", and five printing contents are associated with "Arithmetic problems". An item 803 indicates the content number in the printing targets, associated with each printing content. For example, referring to FIG. 8, content numbers 1 to 6 are associated with six different printing contents of the printing target "Coloring for adult". An item 805 indicates the content number to be printed next (next content number) for each printing content of each printing target. Referring to FIG. 8, for example, the content number "1" and the next content number "2" are associated with the printing content "Coloring for adult (primary) 1" of the printing target "Coloring for adult". This indicates that the printing content "Coloring for adult (primary) 2" is to be printed following the printing content "Coloring for adult (primary) 1". This means that the table illustrated in FIG. 8 also manages the order of print processing. The relay server 103 stores the image data of each printing content as the item 802 illustrated in FIG. 8, for example, in the disk apparatus 302.

In step S604, the CPU 301 acquires such information as "Coloring for adult, coloring for child, and arithmetic problems" as a list of printing targets with reference to the table illustrated in FIG. 8. The information in the table illustrated in FIG. 8 may be configured to be changed by the user of the relay server 103. For example, the user of the relay server 103 may change the contents of the items 801, 802, 803, and 805 in the table illustrated in FIG. 8, on a user interface (UI) screen displayed on the display unit 305.

In step S604, the CPU 301 may change information acquired from the table illustrated in FIG. 8. For example, the CPU 301 may dynamically change the above-described list information by using attribute information including the user's gender and interest, and information about paper sizes supported by the associated MFP 104. For example, if the user's age is equal to or lower than a predetermined age, the CPU 301 may acquire the information in the table illustrated in FIG. 8 by filtering the information to exclude "Coloring for adult".

In step S605, the CPU 301 generates message data of a message 1 (also simply referred to as the message 1) to be audibly output by the speaker 201 of the audio control device 101. The content of the message 1 describes an instruction for guiding the user to the next possible operation, for example, a message for prompting the user to select the printing target acquired in step S604, such as "Coloring for adult, coloring for child, and arithmetic problems can be printed. Which do you want to print?".

In step S606, the relay server 103 transmits the generated message 1 to the audio control device management server 102. In step S607, the audio control device management server 102 further transmits the received message 1 to the audio control device 101. In step S608, the audio control device 101 audibly outputs the received message 1 from the speaker 201 to reproduce the message 1 to the user.

Subsequently, the user selects one of the printable printing targets presented by the message 1 reproduced in step S608. This processing will be described below with reference to FIG. 7. The speaker information identified by the audio control device management server 102 as described above is supplied to the relay server 103 in the function call request in step S603. Accordingly, the processing illustrated in FIG. 7 is performed according to the identified speaker information. In step S701 illustrated in FIG. 7, the user speaks "Print OO" as a selection operation. "OO" indicates one of the printing targets presented by the message 1, for example, "Print a puzzle for adult". In step S702, the audio control device 101 transmits the speech content received in step S701 to the audio control device management server 102. The speech content in this transmission may be audio data or text data, like step S602. In step S703, the audio control device management server 102 issues a request for calling the function of printing "OO" to the relay server 103. When a request is issued in step S703, the speaker information identified when performing step S603 may be transmitted from the audio control device management server 102 to the relay server 103. A speaker may be identified again upon reception of the speech content in step S702. Upon reception of the request, in step S704, the relay server 103 determines whether an additional inquiry is received with respect to the type of the specified printing target. The relay server 103 performs the determination by keeping the table as illustrated in FIG. 8, for example, in the disk apparatus 302 of the relay server 103, and confirming whether a printing target is uniquely specified. When the relay server 103 determines that an additional inquiry is received, then in step S705, the relay server 103 generates data of a message 2 (also simply referred to as the message 2) representing the content to be audibly output to the user.

The content of the message 2 serves as a guidance for clarifying the printing target, i.e., the content that presents the printing target in more detail. For example, when "Coloring" is specified in step S701 as a printing target, the messages, "Coloring for adult" and "Coloring for child" are present in FIG. 8. In this case, message data "Select coloring target from coloring for adult and coloring for child" is generated as the content of the message 2.

In step S706, the relay server 103 transmits the generated message 2 to the audio control device management server 102. In step S707, the audio control device management server 102 further transmits the message 2 to the audio control device 101. In step S708, the audio control device 101 audibly outputs the received message 2 via the speaker 201 to reproduce the message 2 to the user.

Subsequently, the user selects one of the options presented by the message 2 reproduced in step S708. In step S709, the user speaks an additional option. In the case of the message 2 related to the above-described coloring target, the user speaks, for example, "Coloring for adult". In step S710, the audio control device 101 transmits the speech content received in step S709 to the audio control device management server 102. The speech content in the transmission may be audio data or text data, like step S602. In step S711, the audio control device management server 102 issues a request for calling the function of printing the printing target clarified by the additional speech content to the relay server 103.

In the speech in step S701, the user may simultaneously specify print settings in addition to the printing target. For example, the user may speak "Print three copies of coloring for adult in A4 size". In this case, the user specifies "A4" as the print sheet size and "3" as the number of copies. In addition, when print setting information is simultaneously specified with the printing target in the speech in step S701, the speech content is likewise transmitted to the audio control device management server 102 in step S702. Then, the audio control device management server 102 issues a function call request to the relay server 103.

Upon reception of the request, in step S718, the relay server 103 determines the printing content and the print setting information based on the acquired printing target, print setting information, and the identified speaker information, and generates print data. In step S719, the relay server 103 instructs the MFP 104 to perform printing by using the generated print data.

An example where a further audio mail message is output will be described below. For example, if the user speaks "Print three copies of coloring for adult in A4 size", the processing proceeds to the printing execution in step S719. However, the relay server 103 may generate confirmation message data "Three copies of coloring for adult in A4 size will be printed. OK?" before step S718, and transmit the message to the audio control device 101 via the audio control device management server 102. In this case, the above-described confirmation message is audibly output from the speaker 201 of the audio control device 101. When the user speaks "Yes", the audio control device 101 audibly outputs a message "Printing will be started. We look forward to assisting you again in the future" from the speaker 201. Then, the audio control device 101 transmits the speech content "Yes" to the audio control device management server 102 like step S702. In addition, like step S703, a speech content "Yes" is transmitted to the relay server 103, and then the processing in steps S718 and S719 is performed. If the user speaks "No" in the above-described example, the user may repeat the processing from step S601.

FIG. 9 illustrates an example of a table used by the relay server 103 to manage printing history information. The table illustrated in FIG. 9 is kept, for example, in the disk apparatus 302. An item 901 indicates identification information about the identified speaker (also referred to as user identification information). An item 902 indicates the printing target. An item 903 indicates the last print setting. An item 904 indicates the last content number. The printing history information for the identified speaker is kept for each printing target. In a case where the user is a speaker "U21", for example, the print settings and the content number when the printing target "Coloring for adult" was last printed are "Paper size: A4, Number of copies: 2" and "4", respectively. The table illustrated in FIG. 9 may manage other information. For example, while the table illustrated in FIG. 9 manages the last content number, the content number to be used for the next printing may be managed instead of the last content number.

Figure 13:
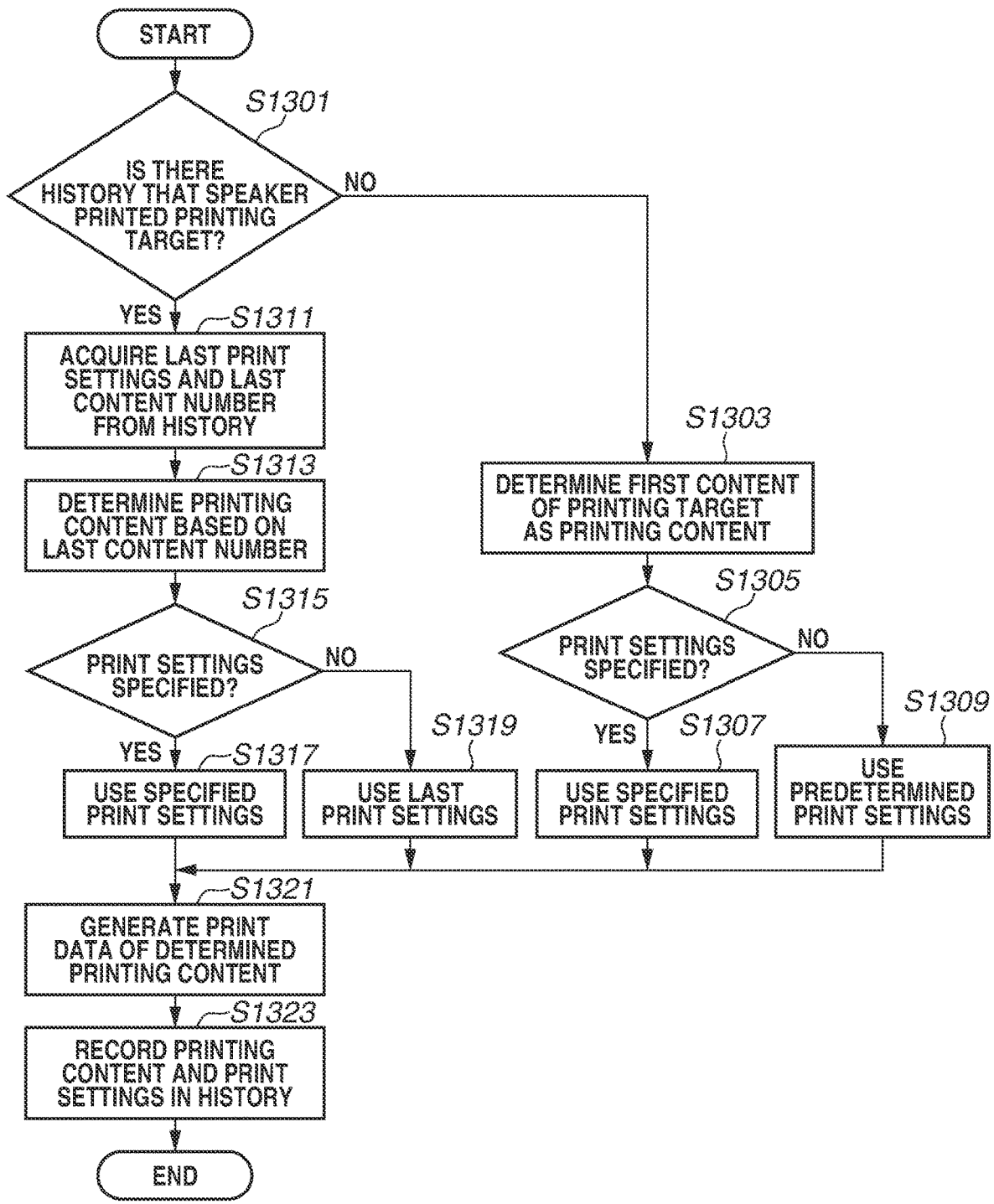
FIG. 13 is a flowchart illustrating print data generation processing.

FIG. 13 is a flowchart illustrating processing performed by the relay server 103 to determine the print setting information and printing content in order to generate print data. As described above, the speaker information is notified to the relay server 103 in step S603 illustrated in FIG. 6 (or S703). The relay server 103 performs the subsequent processing by using the speaker information. The flowchart illustrated in FIG. 13 is started, for example, upon reception of the function call request in step S703 (or S711).

In step S1301, the CPU 301 determines whether there is a history showing that the speaker corresponding to the speaker information notified in step S603 has printed the printing target before. The printing history information is kept in the table illustrated in FIG. 9, as described above. Accordingly, the CPU 301 determines whether the speaker as the item 901 and the printing target as the item 902 are associated with each other for the printing target specified in step S1301. When the CPU 301 determines that the speaker and the printing target are associated with each other, i.e., when the CPU 301 determines that there is a history showing that the speaker has printed the printing target (YES in step S1301), the processing proceeds to step S1311.

On the other hand, when the CPU 301 does not determine that there is a history showing that the speaker has printed the printing target before (NO in step S1301), the processing proceeds to step S1303. In step S1303, the CPU 301 selects the printing content having the smallest content number out of the specified printing targets, with reference to the items 801 and 803 illustrated in FIG. 8. In step S1305, the CPU 301 determines whether the print setting information is included in the function call request in step S703. When the CPU 301 determines that the print setting information is included in the function call request (YES in step S1305), the processing proceeds to step S1307. On the other hand, when the CPU 301 determines that the print setting information is not included in the function call request (NO in step S1305), the processing proceeds to step S1309.

In step S1307, the CPU 301 determines that the print setting information included in the request for printing is to be used. Then, the processing proceeds to step S1321. When the print setting information included in the request designates paper not loaded in the MFP 104, the CPU 301 may automatically change the print setting information or prompt the user to change the print setting information.

In step S1309, the CPU 301 determines that the predetermined print setting information is to be used for printing. Then, the processing proceeds to step S1321. The predetermined print setting information is information preregistered in the relay server 103, including the number of copies "1", the paper size "A4", and "One-side printing". As the paper size, "Letter" may be used depending on the country where a printer is placed.

Processing in step S1311 and subsequent steps (YES in step S1301) will be described below. In step S1311, the CPU 301 acquires the last print setting information and last content number from the printing history information managed in the table illustrated in FIG. 9. In step S1313, the CPU 301 determines the printing content to be used in the present processing flow based on the last content number. More specifically, the CPU 301 uses the printing target in the item 801, the content number in the item 803, and the next content number in the item 805 illustrated in FIG. 8. The CPU 301 acquires the next content number associated with both the printing target specified in step S703 and the last content number acquired in step S1311 and determines the next content number as the printing content. In step S1315, the CPU 301 determines whether the print setting information is included in the function call request in step S703. When the CPU 301 determines that the print setting information is included in the function call request (YES in step S1315), the processing proceeds to step S1317. On the other hand, when the CPU 301 determines that the print setting information is not included in the function call request (NO in step S1315), the processing proceeds to step S1319.

In step S1317, the CPU 301 determines that the print setting information included in the request is to be used for printing. Then, the processing proceeds to step S1321.

In step S1319, the CPU 301 determines that the last print setting information acquired in step S1311 is to be used for printing. Then, the processing proceeds to step S1321.

In step S1321, the CPU 301 generates print data by using the determined print setting information and printing content. In step S1323, the CPU 301 records the determined print setting information and printing content information in the table illustrated in FIG. 9 as printing history information for the identified speaker. The timing for recording the printing history in the table illustrated in FIG. 9 is not limited to steps performed after step S1321. For example, step S1323 may be performed between steps S1313 and S1315 or between steps S1303 and S1305.

When the printing content is printed on a plurality of sheets based on the number of copies specified by the user, the CPU 301 may select whether to print the same printing content on a plurality of sheets or to print a plurality of different printing contents depending on the printing target. For example, when the user specifies the printing of "Coloring for adult" on a plurality of sheets, different printing contents are printed. When the user specifies the printing of "Arithmetic problems" on a plurality of sheets, the printing content of the same arithmetic problem is printed on a plurality of sheets. Such settings may be made, for example, for each printing target in the item 801 of the table illustrated in FIG. 8. More specifically, each printing target may have setting information about whether, in a case where a plurality of copies is specified, to print the same printing content on a plurality of sheets or to sequentially print a plurality of pieces of the print data indicated by the next content number in the item 805. In addition, such a setting may be arbitrarily changed by the user. When printing the different printing contents, the content number printed at the end is recorded as printing history information in the table illustrated in FIG. 9.

In step S701 illustrated in FIG. 7, when the user speaks "Print the previous arithmetic problem", the last printed printing content may be reprinted. In this case, the CPU 301 executes step S1313 illustrated in FIG. 13 and determines that the printing content indicated by the last content number is to be printed as the printing content.

As described above, according to the present exemplary embodiment, when continuous printing contents are printed, the user can continuously print the last printing content for each user simply by audibly inputting a desired printing target. More specifically, when the continuous printing contents are printed, according to the present exemplary embodiment, a burden on the user in specifying a printing content different from the last printed printing content can be eliminated. Depending on the user's instruction, the printing content of the last printed printing target can be reprinted. Since the last print settings are used for each user and for each printing target even if print settings are not specified, usability and accordingly user's convenience can be improved.

According to a second exemplary embodiment, a substitute speaker (substitute user) performs printing of the consignment printing target, in lieu of the consignment speaker. When the user speaks "Print son's arithmetic problems" in step S701 illustrated in FIG. 7, the user who speaks the phrase is referred to as a substitute speaker, the speaker indicated by "Son" in the speech is referred to as a consignment speaker, and the "Arithmetic problems" in the speech is referred to as a consignment printing target. Descriptions equivalent to the first exemplary embodiment will be omitted.

FIG. 11 illustrates an example of a table kept in the relay server 103 to manage substitute printing information. The table illustrated in FIG. 11 is kept, for example, in the disk apparatus 302. FIG. 11 illustrates a table for registering the relation between the substitute speaker, specific word, consignment speaker, and consignment printing target. The table is kept in the relay server 103 before executing the flowchart illustrated in FIG. 14 (described below). Referring to the table, an item 1101 indicates the substitute speaker, an item 1102 indicates the specific word, and an item 1103 indicates the consignment speaker. An item 1104 indicates the consignment printing target. The consignment speaker entrusts the substitute speaker with printing of the target. For example, referring to FIG. 11, the consignment speaker "U22" is associated with the substitute speaker "U21" by the specific word "Son" in the speech of "U21". The consignment printing targets include "Coloring for child" and "Arithmetic problems". The consignment speaker "U22" entrusts the substitute speaker "U21" with printing of the consignment printing targets. The information in the table illustrated in FIG. 11 may be configured to be changed by the user of the audio control device 101. For example, the user of the audio control device 101 may change (edit) the contents of the items 1101 to 1104 in the table illustrated in FIG. 11, on a UI screen offered by the relay server 103. Of course, the UI screen offered by the relay server 103 may be displayed by an information terminal (not illustrated) such as a personal computer (PC) and tablet.

Figure 14:
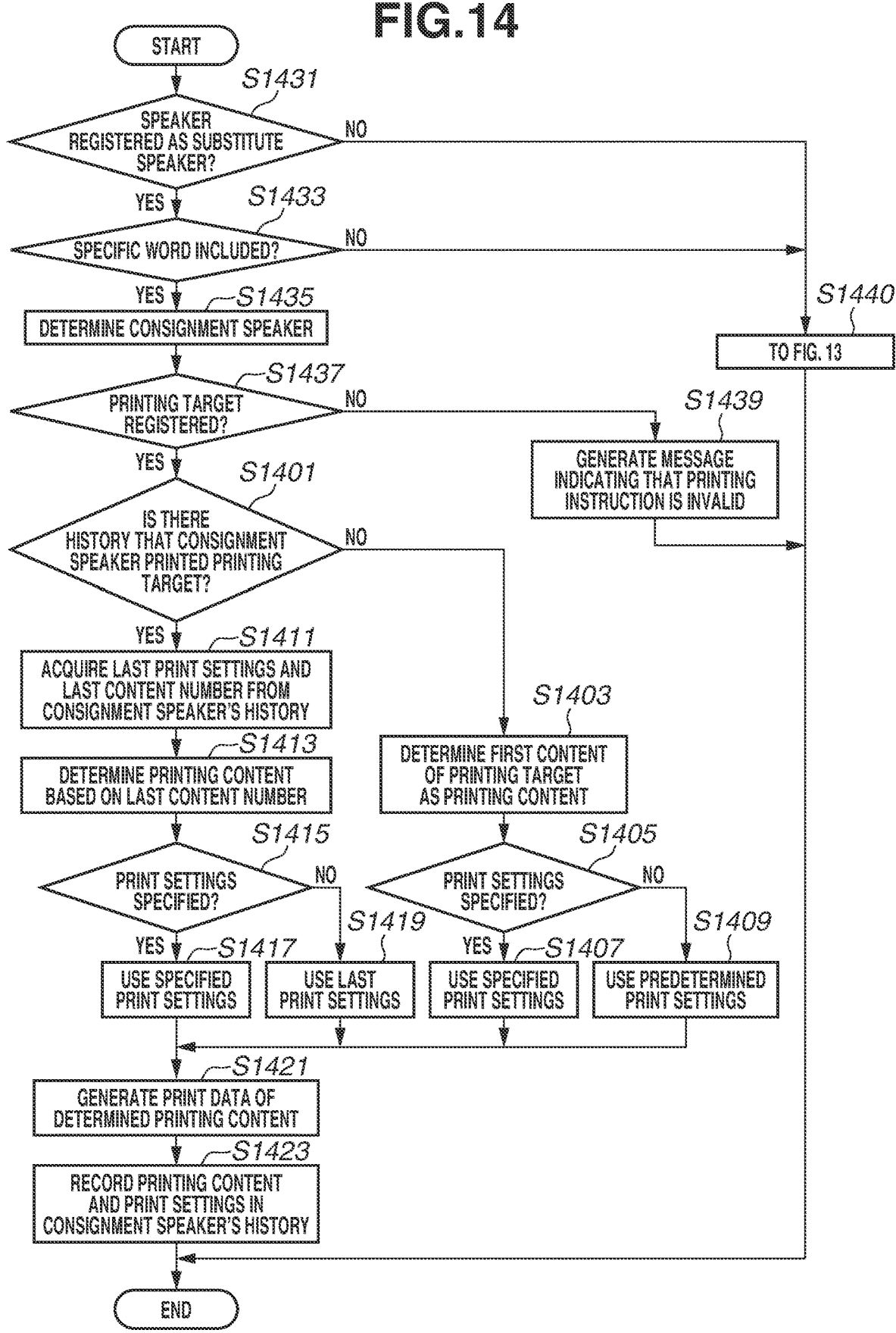
FIG. 14 is a flowchart illustrating another print data generation processing.

FIG. 14 is a flowchart illustrating processing performed by the relay server 103 to determine the print settings and printing content in order to generate print data in step S718 illustrated in FIG. 7. For example, the flowchart illustrated in FIG. 14 is performed upon reception of the function call request in step S703.

In step S1431, the CPU 301 determines whether the speaker is registered as a substitute speaker based on the speaker information received in step S603 illustrated in FIG. 6 (or S703). As described above, the speaker information has been notified to the relay server 103 in step S603 illustrated in FIG. 6 (or S703). Accordingly, step S1431 is implemented when the CPU 301 determines whether the speaker information received in step S603 (or S703) is registered as a substitute speaker in the table illustrated in FIG. 11.

When the CPU 301 determines that the speaker information is registered (YES in step S1431), the processing proceeds to step S1433. In step S1433, the CPU 301 determines whether a specific word indicating the consignment speaker is included in the function call request received in step S703. For example, when U21 is received as speaker information in step S603 illustrated in FIG. 6 (or S703), the CPU 301 can specify "Son" as a specific word corresponding to U21 by referring to FIG. 11. The CPU 301 can implement step S1433 by determining whether "Son" is included in the call request. When the CPU 301 does not determine that the speaker information is registered (NO in step S1431) or does not determine that a specific word is included (NO in step S1433), the processing proceeds to step S1440 in FIG. 14, i.e., the CPU 301 executes the processing of the flowchart illustrated in FIG. 13.

When the CPU 301 determines that a specific word is included in the function call request (YES in step S1433), the processing proceeds to step S1435. In step S1435, the CPU 301 determines a consignment speaker based on the substitute speaker and the specific word. In the example illustrated in FIG. 11, U22 is determined as a consignment speaker.

In step S1437, the CPU 301 determines whether the printing target specified in the call request is associated with the substitute speaker and the consignment speaker, as a consignment printing target. Referring to the example illustrated in FIG. 11, when "Coloring for child" or "Arithmetic problems" is specified by the call request, the CPU 301 determines that the printing target is associated with the substitute speaker and the consignment speaker (YES in step S1437). When the CPU 301 does not determine that the printing target is associated with the substitute speaker and the consignment speaker (NO in step S1437), the processing proceeds to step S1439. In step S1439, the CPU 301 determines that the print instruction based on the call request is invalid and generates message data for audibly notifying the user of the fact. The message is supplied to the audio control device 101 via the audio control device management server 102. For example, the message "Specified printing has failed" is audibly output by the audio control device 101. In step S1439, the CPU 301 supplies message data to the audio control device management server 102. Then, the processing exits the flowchart illustrated in FIG. 14.

In step S1401, the CPU 301 determines whether there is a history showing that the consignment speaker has printed the present consignment printing target. The printing history information is kept in the table illustrated in FIG. 9, as described above. The CPU 301 determines whether the consignment speaker and the consignment printing target are associated with each other. For example, according to the present exemplary embodiment, when coloring for child is included in the call request as a printing target, the CPU 301 determines that there is a history showing that the consignment speaker U22 has printed coloring for child by referring to FIG. 9 (YES in step S1401). When the CPU 301 determines that there is a printing history showing that the consignment speaker has printed the present consignment printing target (YES in step S1401), the processing proceeds to step S1411. On the other hand, when the CPU 301 determines that there is not a printing history showing that the consignment speaker has printed the present consignment printing target (NO in step S1401), the processing proceeds to step S1403.

In step S1403, the CPU 301 selects the printing content having the smallest content number out of the consignment printing targets with reference to the items 801 and 803 illustrated in FIG. 8. In step S1405, the CPU 301 determines whether the print setting information is included in the call request. When the CPU 301 determines that the print setting information is included in the call request (YES in step S1405), the processing proceeds to step S1407. On the other hand, when the CPU 301 determines that the print setting information is not included in the call request (NO in step S1405), the processing proceeds to step S1409. The processing in steps S1407 and S1409 can be the same as or similar to the above-described processing in steps S1307 and S1309, respectively, redundant detailed descriptions thereof will be omitted.

In step S1411, the CPU 301 acquires the last print setting information and the last content number from the printing history information for the consignment speaker illustrated in the table illustrated in FIG. 9. In step S1413, the CPU 301 determines the last content number to be used in this processing flow. More specifically, the CPU 301 uses the printing target in the item 801, the content number in the item 803, and the next content number in the item 805 in the table illustrated in FIG. 8. The CPU 301 acquires the next content number associated with both the printing target identified in step S1437 and the last content number acquired in step S1411 and determines the next content number as a printing content. Then, the CPU 301 executes steps S1415, S1417, and S1419. The processing in these steps can be the same as or similar to the processing in steps S1315, S1317, and S1319, and redundant detailed descriptions thereof will be omitted.

In step S1421, the CPU 301 generates print data by using the determined print setting information and printing content. In step S1423, the CPU 301 records the determined print setting information and printing content as a printing history of the consignment speaker in the table illustrated in FIG. 9. More specifically, in this case, the substitute speaker (U21) speaks "Print son's (U22's) arithmetic problems", and the speaker 901 illustrated in FIG. 9 updates the information on the line of the arithmetic problems of U22.

In step S701 illustrated in FIG. 7, for example, if the user speaks "Print son's arithmetic problems once again", the printing content last printed by the consignment speaker may be reprinted. In this case, the CPU 301 executes step S1413 illustrated in FIG. 14 and determines the printing content indicated by the last content number as the printing content to be printed.

As described above, according to the present exemplary embodiment, when the printing of continuous contents is carried out, the user can continuously print the last printing content of the consignment speaker instead of the user simply by audibly inputting a specific word indicating the desired consignment speaker and a printing target. The user can also reprint the print target content last printed by the consignment speaker. Since the last print settings are used for each consignment speaker and for each printing target even if print settings are not specified, usability can be improved.

A third exemplary embodiment will be described below as an example of processing for determining the content number to be printed when the printing content is updated.

Referring to the table illustrated in FIG. 8, a plurality of printing contents is associated with each printing target. Printing contents are managed by the content numbers and can be changed (edited) as described above.

FIG. 12 illustrates an example of a modified version of the table illustrated in FIG. 8. The table illustrated in FIG. 12 is kept, for example, in the disk apparatus 302. In the table illustrated in FIG. 12, the printing contents "Coloring for adult (medium) 1, "Coloring for adult (medium) 2", and "Coloring for adult (advanced)" in the table illustrated in FIG. 8 have been updated. More specifically, the next content number of the printing content "Coloring for adult (primary) 3" has been changed to "7", and the content number and the next content number of "Coloring for adult (medium) 1" have been changed to "7" and "8", respectively. The content number and the next content number of "Coloring for adult (medium) 2" have been changed to "8" and "9", respectively, and the content number of "Coloring for adult (advanced)" has been changed to "9".

Referring to the table illustrated in FIG. 9, if the user is, for example, the speaker "U21", the print settings include "Paper size: A4, Number of copies: 3" and the content number "4" which have been made when the printing target "Coloring for adult" has been last printed. However, since the content of the content number "4" does not exist in the printing target "Coloring for adult" in the table illustrated in FIG. 12, the CPU 301 cannot acquire the next content number from the table illustrated in FIG. 12. In this case, the CPU 301 may use the content number "1" (first content) of the printing target "Coloring for adult" as the next content number. Alternatively, the CPU 301 may use the content number "7" which is the first content number larger than the content number "4" of the printing target "Coloring for adult" illustrated in FIG. 12.

Thus, the processing for a case where the printing content is updated and the next content number cannot be obtained, is applied to step S1313 illustrated in FIG. 13 and step S1413 illustrated in FIG. 14 according to the above-described exemplary embodiments. Accordingly, printing can be performed from the first content or continuously performed from a suspended content.

Other Embodiments

Although, in the above-described exemplary embodiments, the CPU 301 issues an audible instruction to perform the printing in the sequence illustrated in FIG. 7 after the sequence illustrated in FIG. 6 is carried out, other audible instructions may be issued. For example, the user can also audibly make an inquiry about the status of the printing apparatus. In this case, a call request with respect to the inquiry about the printing state is transmitted from the audio control device management server 102 to the relay server 103. Then, the relay server 103 generates a message indicating the remaining ink amount of the MFP 104 managed for the user and transmits the message to the audio control device management server 102. As a result, a message indicating the remaining ink amount may be audibly output by the audio control device 101. In addition, for example, the user may audibly change setting information related to the printing apparatus. In this case, a call request with respect to a change of the setting information related to the printing apparatus is transmitted from the audio control device management server 102 to the relay server 103. Then, the relay server 103 changes the setting information related to the MFP 104 managed for the user to the setting information specified by the call request. Then, the relay server 103 generates a message indicating the completion of the change and transmits the message to the audio control device 102. As a result, a message indicating the completion of the setting change may be audibly output by the audio control device 101. Examples of changeable setting information include setting information about the power source of the printing apparatus.

The technology of the present disclosure makes it possible to reduce a burden on the user in performing printing-related operations.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-211662, filed Nov. 9, 2018, which is hereby incorporated by reference herein in its entirety.

What is claimed is:

1. A system comprising:
a server having
at least one processor configured to function as:
an execution unit configured to execute processing to cause a printing apparatus to print a first printing content corresponding to a content of an instruction user's n-th speech for executing a first print instruction, when the first print instruction by the instruction user's n-th speech is issued to an audio control device, and
a management unit configured to manage printing history information related to history of printing instructed by the instruction user,
wherein, when a second print instruction by the instruction user's (n+1)-th speech is issued to the audio control device following the first print instruction and a content of the instruction user's (n+1)-th speech for executing the second print instruction is same as the content of the instruction user's n-th speech for executing the first print instruction, the execution unit executes, based on the printing history information for the instruction user, processing to cause the printing apparatus to print a second printing content different from the first printing content printed based on the first print instruction although the content of the instruction user's (n+1)-th speech for executing the second print instruction is same as the content of the instruction user's n-th speech for executing the first print instruction; and
a printing apparatus having a printing unit configured to print the first printing content and the second printing content.

2. The system according to claim 1,
wherein the at least one processor is configured to further function as a user management unit configured to manage substitute printing information for associating the instruction user with a substitute user different from the instruction user, and
wherein, when the substitute user issues an instruction by speech including a same content as the content of the instruction user's n-th speech for executing the first print instruction for the instruction user after the first print instruction is issued, the execution unit executes the processing to cause the printing apparatus to print the second printing content based on the printing history information for the instruction user.

3. The system according to claim 2, wherein, when the substitute user issues an instruction by speech including a same content as the content of the instruction user's n-th speech for executing the first print instruction for the instruction user, the management unit updates the printing history information for the instruction user.

4. The system according to claim 1, wherein the first printing content and the second printing content are at least either one of coloring and arithmetic problems.

5. The system according to claim 1, wherein the at least one processor is configured to further function as a generation unit configured to generate print data for causing the printing apparatus to print the first printing content when the first print instruction is issued to the audio control device, and generate print data for causing the printing apparatus to print the second printing content when the second print instruction is issued to the audio control device.

6. The system according to claim 1, wherein the processing to cause the printing apparatus to print the first printing content is processing to transmit print data to cause the printing apparatus to print the first printing content to the printing apparatus.

7. A method for controlling a system, the system including a server and a printing apparatus, the method comprising:
executing processing, performed by the server, to cause a printing apparatus to print a first printing content corresponding to a content of an instruction user's n-th speech for executing a first print instruction, when the first print instruction by the instruction user's n-th speech is issued to an audio control device; and
managing, performed by the server, printing history information related to history of printing instructed by the instruction user,
wherein, when a second print instruction by the instruction user's (n+1)-th speech is issued to the audio control device following the first print instruction and a content of the instruction user's (n+1)-th speech for executing the second print instruction is same as the content of the instruction user's n-th speech for executing the first print instruction, executing, based on the printing history information for the instruction user, process to cause the printing apparatus to print a second printing content different from the first printing content printed based on the first print instruction although the content of the instruction user's (n+1)-th speech for executing the second print instruction is same as the content of the instruction user's n-th speech for executing the first print instruction; and
printing, performed by the printing apparatus, the first printing content and the second printing content.

8. The method for controlling the system according to claim 7,
wherein user managing for managing substitute printing information for associating the instruction user with a substitute user different from the instruction user, and
wherein, when the substitute user issues an instruction by speech including a same content as the content of the instruction user's n-th speech for executing the first print instruction for the instruction user after the first print instruction is issued, executing the processing to cause the printing apparatus to print the second printing content is selected based on the printing history information for the instruction user.

9. The method for controlling the system according to claim 8, wherein, when the substitute user issues an instruction by speech including a same content as the content of the instruction user's n-th speech for executing the first print instruction for the instruction user, in the managing, the printing history information for the instruction user is updated.

10. The method for controlling the system according to claim 7, wherein the first printing content and the second printing content are at least either one of coloring and arithmetic problems.

11. The method for controlling the system according to claim 7, wherein the generating print data for causing the printing apparatus to print the first printing content when the first print instruction is issued to the audio control device, and generate print data for causing the printing apparatus to print the second printing content when the second print instruction is issued to the audio control device.

12. The method for controlling the system according to claim 7, wherein the processing to cause the printing apparatus to print the first printing content is processing to transmit print data to cause the printing apparatus to print the first printing content to the printing apparatus.

13. A system comprising:
an audio control device having
at least one processor configured to function as:
a receiving unit configured to receive a print instruction by an instruction user's speech; and
a server having
at least one processor configured to function as:
an execution unit configured to execute processing to cause a printing apparatus to print a first printing content corresponding to a content of an instruction user's n-th speech for executing a first print instruction, when the first print instruction by the instruction user's n-th speech is issued to an audio control device, and
a management unit configured to manage printing history information related to history of printing instructed by the instruction user,
wherein, when a second print instruction by the instruction user's (n+1)-th speech is issued to the audio control device following the first print instruction and a content of the instruction user's (n+1)-th speech for executing the second print instruction is same as the content of the instruction user's n-th speech for executing the first print instruction, the execution unit executes, based on the printing history information for the instruction user, processing to cause the printing apparatus to print a second printing content different from the first printing content printed based on the first print instruction although the content of the instruction user's (n+1)-th speech for executing the second print instruction is same as the content of the instruction user's n-th speech for executing the first print instruction.

14. The system according to claim 13,
wherein the at least one processor is configured to further function as a user management unit configured to manage substitute printing information for associating the instruction user with a substitute user different from the instruction user, and
wherein, when the substitute user issues an instruction by speech including a same content as the content of the instruction user's n-th speech for executing the first print instruction for the instruction user after the first print instruction is issued, the execution unit executes the processing to cause the printing apparatus to print the second printing content based on the printing history information for the instruction user.

15. The system according to claim 14, wherein, when the substitute user issues an instruction by speech including a same content as the content of the instruction user's n-th speech for executing the first print instruction for the instruction user, the management unit updates the printing history information for the instruction user.

16. The system according to claim 13, wherein the first printing content and the second printing content are at least either one of coloring and arithmetic problems.

* * * * *